June 20, 1950  E. H. ECKENER  2,512,316
LOCKING SCREW THREAD INSERT
Filed Nov. 2, 1948
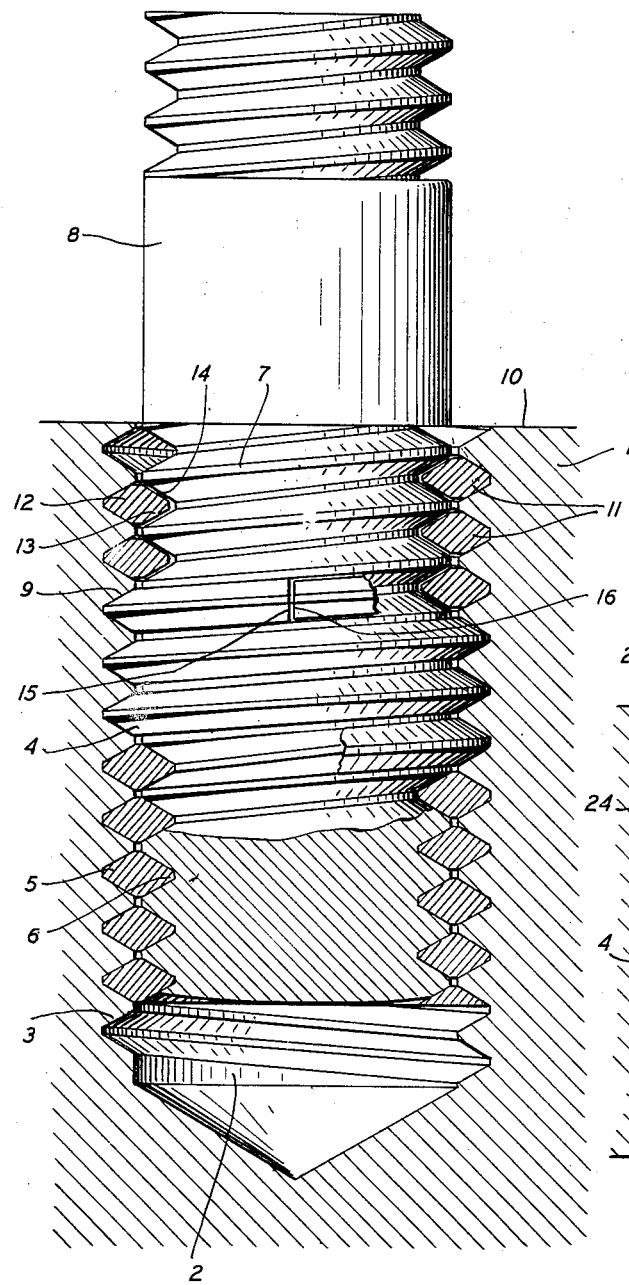
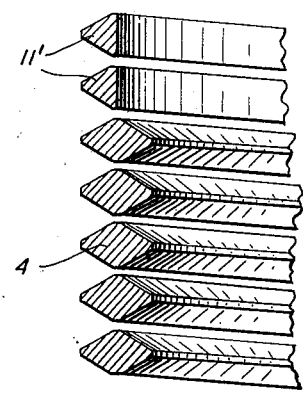
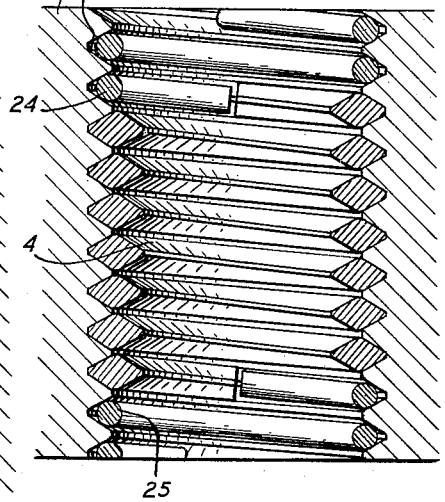
INVENTOR.
ERWIN H. ECKENER
BY Walter S. Alerton
ATTORNEY.

Patented June 20, 1950

2,512,316

UNITED STATES PATENT OFFICE 2,512,316

LOCKING SCREW THREAD INSERT

Erwin H. Eckener, New York, N. Y., assignor to Heli-Coil Corporation, Long Island City, N. Y., a corporation of New York Application November 2, 1948, Serial No. 57,919

6 Claims. (Cl. 151—14)

The present invention relates to locking screw thread inserts, and more in particular to such inserts for studs and the like. Screw thread inserts of the wire coil type, hereinafter designated as "thread inserts," are frequently used for instance, where a stud or threaded bolt of hard metal is to be connected to an internally threaded member of a softer material. Generally the structure is such that a higher friction is set up between the thread insert an the internally threaded member than between the insert and the stud and bolt. This is done in order to prevent movement of the insert relatively to that member when the bolt or stud is intended to be repeatedly screwed in or out. If, however, a very tight fit is required between the insert and the stud or bolt it happens that the insert sticks to the latter and screws out of the internally threaded member when the bolt or stud is turned so as to be disconnected. The invention aims to prevent such happening and to provide means to secure the insert so that it will safely stay with the internally threaded member when a hole or stud screwed into it is to be removed.

The invention essentially consists in that a second or anchoring insert is provided engaging the same internal threading as the first or thread insert in continuation of the latter, wherein the inner cross-sectional portion of the anchoring insert is so shaped that the threading of the bolt or stud when in engagement with or passing through it encounters less friction than when in engagement with said thread insert.

Further details and object of the invention will be apparent from the description given hereinafter and the accompanying drawing illustrating embodiments thereof by way of example. In the drawing:

Fig. 1 is an elevation, partly in section of a screw connection with inserts according to the invention.

Fig. 2 is a section of a portion of a modification.

Fig. 3 is a cross-section of a modified combination of a thread insert with two anchoring inserts in position in a boss member.

Referring, now, to the drawing Fig. 1 a boss member 1 is provided with a blind hole 2 which is interiorly threaded at 3. A wire coil thread insert 4 of conventional type is inserted into the threading 3 so that its lower end is near the bottom of the hole 2. In the illustrated example, the cross-section of the coil-wire is approximately diamond-shaped, the outer substantially triangular portion 5 of the cross-section fitting the threading 3, whereas the inner substantially triangular portion 6 fits the external threading 7 of a stud 8 screwed into the thread insert 4. That insert is shorter than the entire threaded length of the hole 2 so that at least one convolution preferably, several convolutions 9 adjacent the top-surface 10 of member 1 are not occupied by insert 4. Another wire coil insert 11, serving as an anchoring insert, is screwed into the threading convolutions 9 on top of the insert 4. The anchoring insert 11 may be considerably shorter than the thread insert 4. A length of one or a few convolutions will be sufficient. The wire cross-section of insert 11 differs from that of the insert 4. Whereas it is necessary that its outer cross-sectional portion 12 so engages the threading convolutions 9 that a substantial friction is or can be set up between the interengaging parts, the inner cross-sectional portion 13 is smaller than the aforementioned portion 6 so much so that there is no engagement or at least no material friction between that portion and the threading 7 of stud 8 when the latter is screwed into the thread insert 4. Thus, in the illustrated example, the outer portion 12 is shaped like portion 5, and fits the convolutions 9. The inner portion 13, however, is so shaped that there is a clearance 14 between it and the thread convolutions 7 of the stud.

It will be noticed, that the upper end 15 of the thread insert 4 and the lower end 16 of the anchoring insert 11 are close to each other. It is not absolutely necessary that these two ends contact each other, but the arrangement should be such that a very short shift of the thread coil if sticking to a bolt when the latter is to be removed, will cause the thread coil to abut against the anchoring coil.

In order to accomplish the connection, first the thread insert 4 will be screwed into the threading 3 until its trailing end has cleared the convolutions 9. In this position the leading end of the insert will, in most instances, be close to the bottom of the blind hole 2. Thereupon, the anchoing insert 11 is screwed home, preferably until its end 16 abuts against the end 15 of insert 4. Finally, stud 8 will be screwed in. While in the beginning of this operation, the threading 7 of the stud may loosely engage the inner portions 13 of insert 11, the clearance 14 will appear as soon as sufficient convolutions of the stud are in engagement with insert 4.

When, now, the stud is to be screwed out while the friction between it and the thread insert 4 is greater than between the latter and member 1, the insert will tend to stick to the stud and to screw out of the threading 3. If, this occurs, the end 15 will bear or come to bear against the end 16 whereby the friction counteracting the tendency of insert 4 will be increased by that between the insert 11 and the thread convolutions 9. In addition, the torque thus imparted at the lower end 16 of the anchoring insert 11 is in such a direction that insert 11 will be spread or will tend to spread, thereby settling still deeper than originally in the convolutions 9 and increasing its frictional resistance, whereas no increase of friction occurs in connection with the stud. In consequence, insert 11 will be firmly anchored in member 1 and prevent the thread insert 4 from following the stud so that the latter can be screwed out of it.

From the foregoing it will be clear that the shape of the inner portion 13 of the anchoring insert 11 is immaterial provided there is no or only very slight friction between it and the stud engaging the thread insert 4. It is even possible to do without any such inner portion, meaning that the wire of the anchoring insert may have a triangular cross-section merely engaging the threading convolutions 9. Fig. 2 shows in a sectional view a few convolutions of such combination, wherein the insert 4 is of the same shape as in Fig. 1 whereas the wire of the anchoring insert 11' is triangular and has no portions protruding inwardly beyond the outermost thread cylinder of a stud which may be screwed into the insert 4. However, the presence of some inner portion is preferable because it will act as a pilot to guide the stud threading into engagement with the thread insert. Also, the outer portion of the anchoring insert 11 may differ from that of the thread insert 4 provided sufficient friction can be set up between it and the convolutions 9. Furthermore, the material of the anchoring insert 11 may be different from that of the thread insert. Considering the fact that the anchoring insert 11 is not subjected to the load of the stud, its material may be so selected that its strength is less than that of the thread insert 4, thus allowing the use of a cheaper material.

Whereas, with respect to Fig. 1, the invention has been described as applied to a blind threaded hole where undesired movement of the thread insert might be expected in only one direction, provided the insert reaches to the bottom of the hole or at least to the end of the hole threading, the invention is useful too if such movement is to be prevented in both axial directions. This may be the case if the threaded hole runs all the way through a boss member. In such an event an anchoring insert may be applied to each of the ends of the thread insert. This is shown in Fig. 3. In this modification, the member 21 is provided with the internal threading 23 throughout its thickness. The thread insert 4 is located between two short anchoring inserts 24 and 25 of wire which, with reference to what has been stated above, is shown as of a circular cross-section whereas the wire-cross-section of the thread insert 4 is the same as in Fig. 1. It will be clear that the insert 4 when tending to stick to the threading 26 of the bolt 27 will be prevented from moving in an axial direction by either anchoring insert 24 or 25 depending on the direction of a torque applied to the bolt.

Although the invention has been described with reference only to thread inserts of diamond shape, it will be clear that it can be applied to any shape of insert wire and any type of screw threading. There is also the possibility of making the thread insert with its anchoring insert or inserts of one piece, whereby a similar effect can be obtained. However, this is not recommended inasmuch as the production of a wire coil insert with varying cross-section is more expensive and difficult than the production of two different inserts each of uniform cross-section.

The invention is of particular advantage as it is applicable to any threaded hole of sufficient length without requiring an additional operation in order to secure an anchoring means for the thread insert to the interiorly threaded member, and furthermore, as the anchoring insert can be readily removed if necessary, without damaging the boss material.

Many alterations and modifications of the structure shown will be apparent to those skilled in the art without departure from the essence and spirit of the invention which for this reason shall not be limited but by the appended claims.

I claim:

1. In a boss or nut member provided with an internally-screw threaded hole in one of its surfaces, the combination of a wire coil insert having outer portions fittingly engaging the threading of said hole, said insert being of an axial length shorter than said threaded hole and being inserted with its trailing end a distance below said surface, and a second wire coil insert in frictional engagement with the interior threading of said hole between said first insert and said surface, the inner cross-sectional portion of the wire of said second insert being smaller in dimensions relative to those of the first insert, said inserts having adjacent end faces in substantially radial planes so as to constitute abutments for one another.

2. An insert means as claimed in claim 1, said second insert being of a shorter length than said first one.

3. An insert means as claimed in claim 1 wherein all said threadings are V-shaped, the outer cross-sectional portions of the wires of both inserts being similar in shape, the V form of the inner cross-sectional portion of the second insert being smaller in height than that of the first insert.

4. An insert means as claimed in claim 1, the wire of said first insert being of a non-circular cross-section, and the wire of said second insert being circular in cross-section.

5. An insert means as claimed in claim 1, the wire of said first insert being of substantially diamond-shaped cross-section, and the wire of said second insert being of substantially triangular cross-section of a size similar to the outer portion of said diamond shape.

6. In a boss or nut member provided with an internally threaded hole, the combination of a wire coil insert having outer portions fittingly engaging the threading of said hole, said insert being of an axial length shorter than said threaded hole and being inserted with its ends at distances from the ends of said hole, respectively, and a second and a third wire coil insert in frictional engagement with the interior threading of said hole between said first insert and the hole ends, respectively, the inner cross-sectional portions of the wires of said second and third inserts being smaller in dimensions relative to those of said first insert, and said first insert having both end faces and said second and third inserts having their end faces adjacent said first insert in substantially radial planes.

ERWIN H. ECKENER.

REFERENCES CITED

The following references are of record in the file of this patent:

UNITED STATES PATENTS

| Number | Name | Date |
|---|---|---|
| 782,349 | Marshall | Feb. 14, 1905 |
| 2,152,681 | Caminez | Apr. 4, 1939 |
| 2,363,663 | Findley | Nov. 28, 1944 |